US012113626B2

(12) United States Patent
Xu et al.

(10) Patent No.: US 12,113,626 B2
(45) Date of Patent: *Oct. 8, 2024

(54) DOWNLINK CONTROL INFORMATION FOR DORMANCY INDICATION AND ONE-SHOT HYBRID AUTOMATIC REPEAT REQUEST FEEDBACK (71) Applicant: QUALCOMM Incorporated, San Diego, CA (US)

(72) Inventors: Huilin Xu, Temecula, CA (US); Xiaoxia Zhang, San Diego, CA (US); Jing Sun, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,628

(22) Filed: Mar. 20, 2023

(65) Prior Publication Data

US 2023/0299886 A1 Sep. 21, 2023

Related U.S. Application Data (63) Continuation of application No. 16/949,485, filed on Oct. 30, 2020, now Pat. No. 11,611,411.

(Continued)

(51) Int. Cl.
*H04L 1/1812* (2023.01)
*H04W 72/23* (2023.01)

(52) U.S. Cl.
CPC ........... *H04L 1/1812* (2013.01); *H04W 72/23* (2023.01)

(58) Field of Classification Search
CPC .............. H04L 1/1812; H04L 1/1864; H04W 52/0229; H04W 72/042; H04W 72/23; Y02D 30/70
See application file for complete search history.

(56) References Cited

U.S. PATENT DOCUMENTS 9,461,856 B2 * 10/2016 Han ..................... H04L 5/0046
9,674,727 B2    6/2017 Damnjanovic et al.
(Continued)

FOREIGN PATENT DOCUMENTS

CN    107005872 A    8/2017
CN    110012499 A    7/2019
(Continued)

OTHER PUBLICATIONS

Ericsson, Summary of efficient and low latency serving cell configuration/activation/setup, Nov. 18, 2019, 3GPP TSG-RAN WG1 #99, Reno, USA, Agenda item: 7.2.13.3, Tdoc: R1-1913334 (Year: 2019).*

(Continued)

*Primary Examiner* — Eric Nowlin
(74) *Attorney, Agent, or Firm* — Harrity & Harrity, LLP (57) ABSTRACT

A method, an apparatus, and a computer program product for wireless communication are provided. A user equipment (UE) may receive, via a control channel in a primary cell, one or more downlink control information (DCI) messages that include a secondary cell (SCell) dormancy indication and a request for hybrid automatic repeat request (HARQ) feedback. The DCI messages may have a format associated with downlink scheduling, and fields used to carry the SCell dormancy indication and the request for HARQ feedback may have a configuration that depends on whether the DCI messages are used to schedule a downlink data transmission. Furthermore, in some aspects, a DCI message may include a field that has a value to indicate whether the DCI message does or does not schedule a downlink data transmission, to enable the UE to correctly receive and decode the SCell dormancy indication and the request for HARQ feedback.

30 Claims, 6 Drawing Sheets

Related U.S. Application Data (60) Provisional application No. 62/944,308, filed on Dec. 5, 2019.

(56) References Cited

U.S. PATENT DOCUMENTS

| | | | |
|---|---|---|---|
| 9,794,035 B2* | 10/2017 | Han | H04L 1/1812 |
| 10,356,803 B2* | 7/2019 | Kim | H04W 76/14 |
| 10,757,587 B2 | 8/2020 | Hong | |
| 10,887,800 B2 | 1/2021 | Ang et al. | |
| 10,945,279 B2* | 3/2021 | Kim | H04L 27/2678 |
| 11,284,429 B2* | 3/2022 | Abdoli | H04L 5/0055 |
| 11,576,085 B2* | 2/2023 | Ang | H04J 11/0076 |
| 11,611,411 B2* | 3/2023 | Xu | H04W 52/0229 |
| 11,838,915 B2* | 12/2023 | Li | H04L 1/1896 |
| 11,917,709 B2* | 2/2024 | Islam | H04L 1/1822 |
| 2011/0134774 A1 | 6/2011 | Pelletier et al. | |
| 2015/0215929 A1 | 7/2015 | Damnjanovic et al. | |
| 2015/0271806 A1 | 9/2015 | Kim et al. | |
| 2017/0019227 A1* | 1/2017 | Han | H04L 27/2602 |
| 2017/0331565 A1 | 11/2017 | Westerberg et al. | |
| 2018/0367278 A1 | 12/2018 | Chatterjee et al. | |
| 2019/0124558 A1 | 4/2019 | Ang et al. | |
| 2019/0190682 A1 | 6/2019 | Kadiri et al. | |
| 2019/0208429 A1 | 7/2019 | Hong | |
| 2019/0357240 A1* | 11/2019 | Kim | H04L 27/2678 |
| 2020/0092814 A1 | 3/2020 | Zhou et al. | |
| 2020/0205041 A1 | 6/2020 | Ang et al. | |
| 2021/0029772 A1 | 1/2021 | Islam et al. | |
| 2021/0044388 A1* | 2/2021 | Cao | H04W 72/23 |
| 2021/0127414 A1* | 4/2021 | Abdoli | H04L 1/1887 |
| 2021/0143970 A1 | 5/2021 | Xu et al. | |
| 2021/0168776 A1 | 6/2021 | Li et al. | |
| 2021/0176012 A1 | 6/2021 | Xu et al. | |
| 2021/0242977 A1 | 8/2021 | Khoshnevisan et al. | |
| 2021/0250920 A1 | 8/2021 | Kim et al. | |
| 2021/0274536 A1* | 9/2021 | Shin | H04L 1/18 |
| 2021/0314953 A1 | 10/2021 | Park et al. | |
| 2021/0329677 A1 | 10/2021 | Huang | |
| 2021/0368447 A1 | 11/2021 | Kim et al. | |
| 2021/0400763 A1* | 12/2021 | Zhou | H04W 52/0216 |
| 2022/0052790 A1* | 2/2022 | Lei | H04L 1/1607 |
| 2022/0052794 A1 | 2/2022 | Xu et al. | |
| 2022/0053542 A1* | 2/2022 | Xu | H04W 72/1263 |
| 2022/0190981 A1 | 6/2022 | Xu | |
| 2022/0240189 A1 | 7/2022 | Mu | |
| 2022/0256462 A1* | 8/2022 | Li | H04W 76/15 |
| 2022/0279439 A1* | 9/2022 | Li | H04W 52/0212 |
| 2022/0303899 A1* | 9/2022 | Ma | H04W 24/08 |
| 2022/0312313 A1* | 9/2022 | Ma | H04W 24/08 |
| 2022/0394682 A1* | 12/2022 | Nory | H04W 72/0453 |
| 2023/0292337 A1* | 9/2023 | Luo | H04W 72/1263 |
| 2024/0073941 A1* | 2/2024 | Abotabl | H04L 5/0053 |

FOREIGN PATENT DOCUMENTS

| | | | | |
|---|---|---|---|---|
| CN | 110383733 A | 10/2019 | | |
| CN | 111264042 | 6/2020 | | |
| CN | 113647149 A | 11/2021 | | |
| CN | 114270945 A | 4/2022 | | |
| CN | 114501498 A | 5/2022 | | |
| CN | 115066955 A | 9/2022 | | |
| EP | 3890205 A1 | 10/2021 | | |
| EP | 4009706 A1 | 6/2022 | | |
| EP | 4055949 A1 | 9/2022 | | |
| TW | 202135498 A * | 9/2021 | | H04L 1/1607 |
| WO | 2015108636 | 7/2015 | | |
| WO | 2015116353 | 8/2015 | | |
| WO | 2019084184 A1 | 5/2019 | | |
| WO | 2021031045 A1 | 2/2021 | | |
| WO | 2021088017 A1 | 5/2021 | | |
| WO | 2021091467 A1 | 5/2021 | | |
| WO | WO-2021092273 A1 * | 5/2021 | | H04L 1/1607 |
| WO | WO-2021113856 A1 * | 6/2021 | | H04L 1/1812 |
| WO | 2021158061 A1 | 8/2021 | | |
| WO | 2021259183 A1 | 12/2021 | | |

OTHER PUBLICATIONS

International Preliminary Report on Patentability—PCT/US2020/070735—The International Bureau of WIPO—Geneva, Switzerland—Jun. 16, 2022.
International Search Report and Written Opinion—PCT/US2020/070735—ISA/EPO—Feb. 23, 2021.
Taiwan Search Report—TW109138044—TIPO—Dec. 13, 2023.
Ericsson: "Summary#4 of Efficient and Low Latency Serving Cell Configuration/Activation/Setup", 3GPP TSG-RAN WG1 #99, R1-1913549, Reno, USA, Nov. 18-22, 2019, pp. 1-25.
European Search Report—EP23206491—Search Authority—The Hague—Mar. 27, 2024.
Qualcomm Incorporated: "SCell Dormancy and Fast SCell Activation," 3GPP TSG-RAN WG1 #99, R1-1912980, 3rd Generation Partnership Project, Mobile Competence Centre, 650, Route Des Lucioles, F-06921, Sophia-Antipolis Cedex, France, vol. Ran WG1. No. Reno. USA, 20191118- 20191122, Nov. 9, 2019, XP051823742, pp. 1-13, The whole document.
Qualcomm Incorporated: "Fast SCG and SCell Activation", 3GPP TSG-RAN WG1 #98, R1-1909287, 3GPP, Mobile Competence Centre, 650, Route Des Lucioles, F-06921, Sophia-Antipolis Cedex, France, vol. RAN WG1, No. Prague, Czech Republic, 20190826-20190830, Aug. 17, 2019, pp. 1-11, XP051765892.

* cited by examiner

DOWNLINK CONTROL INFORMATION FOR DORMANCY INDICATION AND ONE-SHOT HYBRID AUTOMATIC REPEAT REQUEST FEEDBACK

CROSS-REFERENCE TO RELATED APPLICATION

This application is a continuation of U.S. Non-Provisional application Ser. No. 16/949,485 entitled "DOWNLINK CONTROL INFORMATION FOR DORMANCY INDICATION AND ONE-SHOT HYBRID AUTOMATIC REPEAT REQUEST FEEDBACK" and filed on Oct. 30, 2020, which claims the benefit of U.S. Provisional Patent Application No. 62/944,308, filed on Dec. 5, 2019, entitled "DOWNLINK CONTROL INFORMATION FOR DORMANCY INDICATION AND ONE-SHOT HYBRID AUTOMATIC REPEAT REQUEST FEEDBACK" and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for downlink control information (DCI) for a dormancy indication and one-shot hybrid automatic repeat request (HARD) feedback.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some communications systems, such as 5G, a secondary cell group (SCG) may be defined for a user equipment (UE) communicating with one or more base stations. The SCG may include one or more serving cells associated with a secondary radio access network (RAN) node (sometimes termed a secondary node or SN). For example, the SN may be a base station that provides connectivity to the UE in addition to a master RAN node (sometimes termed a master node or MN). By enabling dual-connectivity in this way, the MN and the SN may enable improved connectivity, coverage area, and/or bandwidth for the UE. For example, in some cases, the SCG may be configured to enable carrier aggregation to provide for communication in one or more bands using at least two component carriers, which may include a primary component carrier (PCC) or primary cell (PCell) and one or more secondary cells (SCells), primary secondary cells (PSCells), secondary component carriers (SCCs), and/or the like. In some cases, such as when an MN and a master cell group (MCG) associated with the MN have a bandwidth to support traffic associated with the UE, access to the SCG may result in unnecessary overhead or power utilization by the UE. Accordingly, the MN may place one or more activated SCells in a dormancy mode for a period of time and may reactivate the dormant SCells when, for example, the MN no longer has the bandwidth to support traffic associated with the UE.

In some cases, a base station may transmit information on a control channel (e.g., a physical downlink control channel (PDCCH)) associated with the PCell to indicate the dormancy mode associated with one or more activated SCells in the same cell group. Accordingly, a UE may generally be configured to monitor the control channel for downlink control information (DCI) that includes an SCell dormancy indication. For example, the DCI used to convey the SCell dormancy indication may include a non-fallback DCI message (e.g., DCI format 0_1 for uplink scheduling or DCI format 1_1 for downlink scheduling), and the configuration of the SCell dormancy indication may vary depending on whether the DCI message schedules data (e.g., a physical uplink shared channel (PUSCH) data transmission where the DCI is used for uplink scheduling, or a physical downlink shared channel (PDSCH) data transmission where the DCI is used for downlink scheduling). For example, in cases where the DCI schedules data, the SCell dormancy indication may be provided in a field appended to the non-fallback DCI message having DCI format 0_1 or DCI format 1_1.

Alternatively, in cases where the DCI does not schedule data, the SCell dormancy indication may be provided in one or more unused fields of a non-fallback DCI message having DCI format 1_1. These varying options can create ambiguity, however, especially in context with other information that may be conveyed in DCI.

For example, in addition to monitoring the control channel for the SCell dormancy indication, a UE may also be configured to monitor the control channel for an indicator containing a request for one-shot hybrid automatic repeat request (HARD) acknowledgement (HARQ-ACK) codebook feedback, which is generally requested in DCI having DCI format 1_1 for downlink scheduling. Accordingly, although an SCell dormancy indication can be provided in a field appended to a DCI message having DCI format 0_1 for uplink scheduling when the DCI schedules data, a DCI message having DCI format 0_1 cannot be easily configured to convey a request for one-shot HARQ-ACK feedback. Furthermore, while a frequency domain resource allocation (FDRA) field in the DCI can be set to a particular value to indicate that the DCI is not used for scheduling data when the DCI is used for conveying an SCell dormancy indicator, the value to be used in the FDRA field in order to indicate that the DCI is not used for scheduling data is undefined in cases where the DCI is used to convey a one-shot HARQ-ACK feedback. Accordingly, various ambiguities and inconsistencies may arise when both SCell dormancy and one-shot HARQ-ACK feedback are configured for a UE.

Some aspects described herein provide techniques and apparatuses to configure DCI to carry both an SCell dormancy indication and a HARQ feedback indication. For example, the DCI may include the SCell dormancy indication and the HARQ feedback indication in one or more DCI messages that have a format associated with downlink scheduling, such as DCI format 1_1, which may provide a consistent DCI format for the SCell dormancy indication and the HARQ feedback indication. Furthermore, in cases where a DCI message is used to schedule data, the SCell dormancy indication and the HARQ feedback indication may be provided in separate fields that are appended to the DCI message, or one of the SCell dormancy indication or the HARQ feedback indication may be provided in a separate DCI message that does not schedule data. Furthermore, in cases where a DCI message does not schedule data, an FDRA field may have a predefined value to indicate that the DCI message does not schedule data. In this case, one or more unused fields of the DCI message can be used to carry the SCell dormancy indication and/or the HARQ feedback indication. In either case, regardless of whether the SCell dormancy indication and the HARQ feedback indication are appended to the DCI message that schedules data, or carried in unused fields of the DCI message that does not schedule data, a quantity of bits may be added to the DCI message in cases where the DCI message that schedules data and the DCI message that does not schedule data have different sizes, until the DCI messages have an equal size. In this way, the UE may apply consistent behavior to receive and decode a set of one or more DCI messages that include an SCell dormancy indication and a HARQ feedback indication.

In aspects of the disclosure, a method, a UE, a base station, an apparatus, and a computer program product are provided.

In some aspects, the method may by performed by a UE. The method may include: monitoring a control channel in a PCell for an SCell dormancy indication and a HARQ feedback indication; and receiving, via the control channel, the SCell dormancy indication and the HARQ feedback indication in DCI, wherein the DCI includes the SCell dormancy indication and the HARQ feedback indication in one or more DCI messages having a format associated with downlink scheduling.

In some aspects, the UE may include a memory and one or more processors operatively coupled to the memory. The memory and the one or more processors may be configured to: monitor a control channel in a PCell for an SCell dormancy indication and a HARQ feedback indication; and receive, via the control channel, the SCell dormancy indication and the HARQ feedback indication in DCI, wherein the DCI includes the SCell dormancy indication and the HARQ feedback indication in one or more DCI messages having a format associated with downlink scheduling.

In some aspects, the computer program product may include a non-transitory computer-readable medium storing one or more instructions. The one or more instructions, when executed by one or more processors of a UE, may cause the one or more processors to: monitor a control channel in a PCell for an SCell dormancy indication and a HARQ feedback indication; and receive, via the control channel, the SCell dormancy indication and the HARQ feedback indication in DCI, wherein the DCI includes the SCell dormancy indication and the HARQ feedback indication in one or more DCI messages having a format associated with downlink scheduling.

In some aspects, the apparatus may include: means for monitoring a control channel in a PCell for an SCell dormancy indication and a HARQ feedback indication; and means for receiving, via the control channel, the SCell dormancy indication and the HARQ feedback indication in DCI, wherein the DCI includes the SCell dormancy indication and the HARQ feedback indication in one or more DCI messages having a format associated with downlink scheduling.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with a 5G radio access technology (RAT, aspects of the present disclosure can be applied to other RATs, such as a 3G RAT, a 4G RAT, and/or a RAT subsequent to 5G (e.g., 6G).

Figure 1:
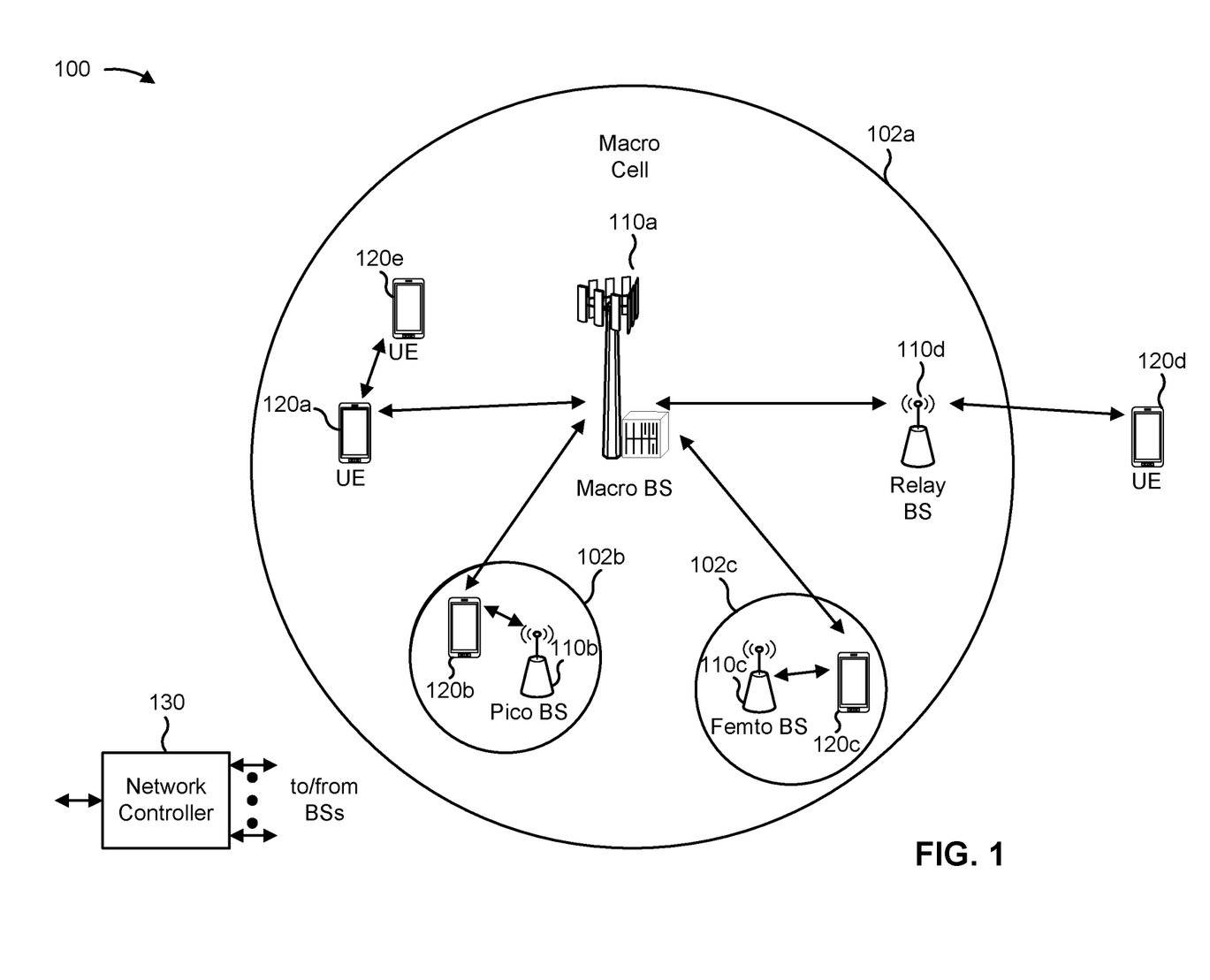
FIG. 1 is diagram illustrating an example of a wireless network.

FIG. 1 is a diagram illustrating an example of a wireless network 100 in which aspects of the present disclosure may be practiced. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor/device, a wearable device (a smart watch, smart clothing, smart glasses, a smart wrist band, smart jewelry (e.g., a smart ring, a smart bracelet)), an entertainment device (e.g., a music or video device, or a satellite radio), a vehicular component or sensor, a smart meter/sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time— frequency resources and having a cellular configuration, a P2P configuration, and a mesh configuration, a scheduling entity and one or more subordinate entities may communicate utilizing the scheduled resources.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some cases, UEs 120 may communicate in a dual-connectivity mode, a carrier aggregation mode, and/or the like, which may include a primary cell (PCell) and one or more secondary cells (SCells) that are associated with the same BS 110 or different BSs 110. In some aspects, a BS 110 may use the PCell to transmit control signaling related to the SCell(s). For example, in some aspects, the control signaling may include downlink control information (DCI) that includes an SCell dormancy indicator to identify one or more SCells that are operating in a dormancy mode. Additionally, in some cases, the DCI may include a request for one-shot hybrid automatic repeat request (HARD) acknowledgement (ACK) codebook feedback, such as when the UE communicates with one or more SCells in an unlicensed spectrum. In some aspects, when the DCI includes the SCell dormancy indicator and triggers one-shot HARQ-ACK codebook feedback, the BS 110 may determine a format for the DCI and configure one or more DCI messages to include fields for the SCell dormancy indicator and the request for HARQ-ACK feedback. For example, the SCell dormancy indicator and the request for HARQ-ACK feedback may be provided in one or more fields that are appended to a DCI message that schedules data, in one or more unused fields of a DCI message that does not schedule data, and/or the like. Furthermore, in cases where the DCI message does not schedule data, the DCI message may include a predefined value in a frequency domain resource allocation (FDRA) field to indicate that the DCI message does not schedule data such that the UE may know to decode the SCell dormancy indicator and the request for HARQ-ACK feedback from the one or more unused fields of the DCI message.

As indicated above, FIG. 1 is provided merely as an example. Other examples may differ from what is described with regard to FIG. 1.

Figure 2:
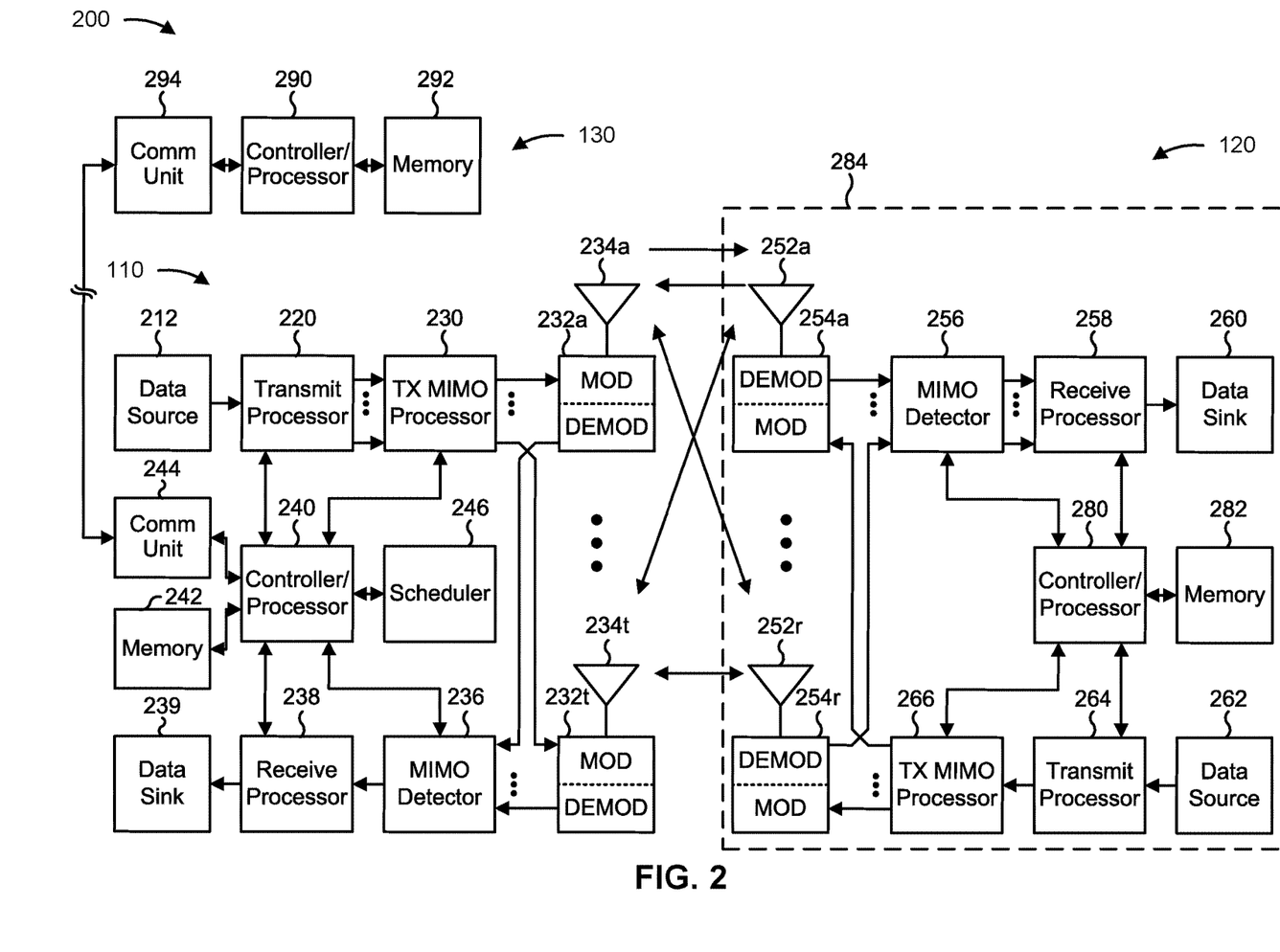
FIG. 2 is a diagram illustrating an example of a base station in communication with a UE in a wireless network.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal (e.g., an RRC signal to configure one or more component carrier sets, a MAC-CE to indicate a beam update command, and/or the like). T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), a channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with downlink control information (DCI) for a dormancy indication and one-shot hybrid automatic repeat request (HARD) feedback, as described in more detail elsewhere herein. For example, controller/processor 240 of base station 110, controller/processor 280 of UE 120, and/or any other component(s) of FIG. 2 may perform or direct operations of, for example, method 400 of FIG. 4 and/or other processes as described herein. Memories 242 and 282 may store data and program codes for BS 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, interpreting the instructions, and/or the like.

As indicated above, FIG. 2 is provided merely as an example. Other examples may differ from what is described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In some aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
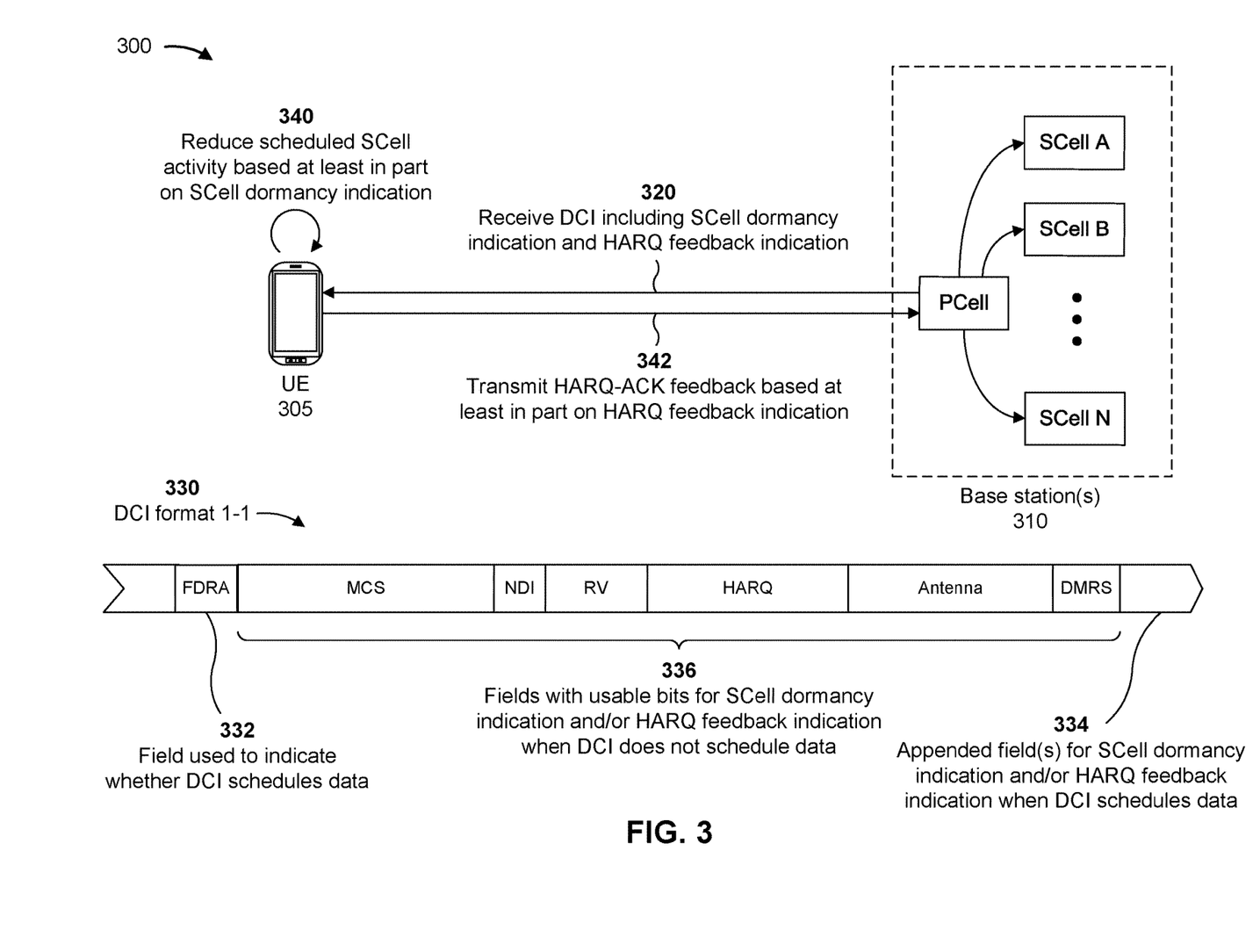
FIG. 3 is a diagram illustrating one or more examples of downlink control information for a dormancy indication and one-shot hybrid automatic repeat request feedback.

FIG. 3 is a diagram illustrating one or more examples 300 of downlink control information (DCI) for providing a secondary cell (SCell) dormancy indication and triggering one-shot hybrid automatic repeat request (HARQ) feedback. As shown in FIG. 3, example(s) 300 may include a UE 305 communicating with one or more base stations 310 providing a primary cell (PCell) and one or more SCells in a cell group, which can generally include up to 15 SCells. In some aspects, the PCell and the one or more SCells may be provided by a single base station 110, or the PCell and the one or more SCells may be provided by different base stations 110. Furthermore, in some aspects, the PCell may be a primary cell in a master cell group (MCG), a primary secondary cell (PSCell) in a secondary cell group (SCG), and/or the like.

At 320, the base station 110 may transmit, and the UE may receive, DCI that includes an SCell dormancy indication and a HARQ feedback indication. For example, in some aspects, one or more of the SCells that are associated with the PCell may be placed into a dormant mode, such as when the PCell has sufficient bandwidth to support traffic associated with the UE 305, in order to reduce overhead, power consumption by the UE 305, and/or the like. Additionally, or alternatively, one or more of the SCells may be transitioned from the dormant mode to non-dormant mode, such as when the PCell has insufficient bandwidth to support traffic demands of the UE 305. When an SCell is in a dormant mode, behavior of the UE 305 in the dormant SCell may be referred to as "dormancy-like" behavior. When an SCell is in a non-dormant mode, the behavior of the UE 305 in the non-dormant SCell may be referred to as "non-dormancy-like" behavior.

In some aspects, the SCell dormancy indication may be transmitted to the UE 305 via a control channel (e.g., a physical downlink control channel (PDCCH)) to indicate a dormancy mode associated with one or more activated SCells in the cell group associated with the UE 305. For example, as mentioned above, the cell group may generally include up to 15 SCells, whereby the SCell dormancy indication may include a bitmap with a quantity of bits (up to 15) that corresponds to a quantity of the SCells in the cell group, with each bit in the bitmap indicating the dormant mode associated with a corresponding SCell. Furthermore, in some aspects, the HARQ feedback indication may include a single bit that is used to indicate whether HARQ-ACK codebook feedback is triggered, requested, and/or the like. For example, as described in more detail elsewhere herein, the HARQ feedback indication may trigger HARQ-ACK codebook feedback for one or more downlink transmissions, in which case the UE 305 may transmit HARQ-ACK codebook feedback that includes an acknowledgement (ACK) to indicate that a particular downlink transmission was successfully received, or a negative acknowledgement (NACK) to indicate that a particular downlink transmission was not successfully received.

In some aspects, the UE 305 may monitor the control channel in the PCell for the DCI that includes the SCell dormancy indication and the HARQ feedback indication during certain time periods. For example, in some aspects, the UE 305 may monitor the control channel associated with the PCell during a radio connected active time (e.g., continuously while operating in a radio connected mode, such as a radio resource control (RRC) connected mode), or the UE 305 may monitor the control channel during an active time within a discontinuous reception (DRX) cycle configured for the UE 305. Additionally, or alternatively, the UE 305 may monitor the control channel outside the DRX active time for a wake-up signal (WUS), which may carry the DCI that includes the SCell dormancy indication. In some aspects, as described herein, the DCI that carries the SCell dormancy indication and the HARQ feedback indication may schedule data (e.g., a downlink data transmission, such as a physical downlink shared channel (PDSCH)), and may include one or more fields to indicate whether the DCI schedules data. Furthermore, as described herein, the DCI that carries the SCell dormancy indication and the HARQ feedback indication has a format that ensures a consistent representation for conveying the SCell dormancy indication, the HARQ feedback indication, and information that indicates whether the DCI schedules data.

For example, as shown by reference number 330, contents of the DCI that includes the SCell dormancy indication and the HARQ feedback indication may be based on a non-fallback DCI format for downlink scheduling (e.g., DCI format 1_1). In this way, the DCI may have a format that is consistent across cases in which the DCI schedules data, in which case the DCI can be based on non-fallback DCI formats for downlink scheduling (e.g., DCI format 1_1) or non-fallback DCI formats for uplink scheduling (e.g., DCI format 0_1), and cases in which the DCI does not schedule data and/or triggers HARQ-ACK feedback, in which case the DCI can be based on non-fallback DCI formats for downlink scheduling only. Accordingly, by using the non-fallback DCI format for downlink scheduling, the DCI can be configured to carry the SCell dormancy indication and the HARQ feedback indication in cases where the DCI schedules data and in cases where the DCI does not schedule data.

For example, as shown by reference number 332, the contents of the DCI may include a DCI message having a frequency domain resource allocation (FDRA) field, where a value of the FDRA field may be set to a predefined value to indicate that the DCI message is not being used to schedule data (e.g., a downlink data transmission, such as a PDSCH). For example, in some aspects, the FDRA field may be set to a predefined invalid value to indicate that the DCI message is not being used to schedule data, and the invalid value may be based at least in part on a resource allocation type associated with the UE 305 (e.g., all '1's when the UE 305 is configured with a type-1 resource allocation, all '0's when the UE 305 is configured with a type-0 resource allocation, and/or the like). Alternatively, in some aspects, the FDRA field may be set to a predefined valid value to indicate that the DCI message is not being used to schedule data, in which case the predefined valid value may be unavailable to use for data scheduling purposes. Furthermore, in some aspects, the predefined valid value may differ depending on the resource allocation type configured for the UE 305 (e.g., a first predefined valid value may be used in the FDRA field to indicate that the DCI does not schedule data when the UE 305 is configured with a type-1 resource allocation, and a different valid value may be used to indicate that the DCI does not schedule data when the UE 305 is configured with a type-0 resource allocation). In some aspects, the FDRA field may be set to the predefined invalid value to indicate that the DCI does not schedule data and includes the SCell dormancy indication and/or the HARQ feedback indication. Additionally, or alternatively, in some aspects, the FDRA field may be set to the predefined valid value to indicate that the DCI does not schedule data and includes only the HARQ feedback indication (e.g., with the SCell dormancy indication provided in a separate DCI message). Accordingly, as described herein, the FDRA field may be set to a predefined value to indicate that the DCI message is not being used to schedule data, and may alternatively indicate that the DCI message is being used to schedule data when the FDRA field is set to a valid value that has not been reserved to indicate that the DCI does not schedule data.

In some aspects, as shown by reference number 334, the DCI message may include one or more appended fields that are used to carry the SCell dormancy indication and/or the HARQ feedback indication in cases where the DCI message is used to schedule data. For example, as described elsewhere herein, up to 15 SCells can be configured for the UE 305, whereby an appended field used to carry the SCell dormancy indication may include up to 15 bits (e.g., depending on a quantity of SCells that are configured for the UE 305). Alternatively, an appended field used to carry the SCell dormancy indication may include up to 5 bits to indicate the dormancy mode for up to 5 SCell groups, with each SCell group containing one or more SCells. Furthermore, the HARQ feedback indication may be a single bit, whereby an appended field used to carry the HARQ feedback indication may be one bit that may be set to a first value (e.g., zero) to indicate that HARQ-ACK codebook feedback is not triggered, or to a second value (e.g., one) to indicate that HARQ-ACK codebook feedback is triggered. Accordingly, in cases where the DCI message schedules data and both the SCell dormancy indication and the HARQ feedback indication are configured, separate fields may be appended to the DCI (e.g., a first appended field having up to 15 bits for the SCell dormancy indication and a second appended field having one bit for the HARQ feedback indication, or a first appended field having up to 5 bits for the SCell dormancy indication for up to 5 SCell groups and a second appended field having one bit for the HARQ feedback indication). Additionally, or alternatively, when the DCI message schedules data, a single field may be appended to the DCI message to carry either the SCell dormancy indication or the HARQ feedback indication, and a separate DCI message that does not schedule data may be used to communicate the other indication. In this case, the appended field may be configured for the SCell dormancy indication, which can have up to 15 bits (one for each SCell) or up to 5 bits (one for each SCell group) and can therefore be used for the SCell dormancy indication or the HARQ feedback indication. Additionally, or alternatively, in some aspects, separate fields for the SCell dormancy indication and the HARQ feedback indication may be appended to the DCI message, but only one or the other may be used.

In some aspects, as shown by reference number 336, the DCI message may include one or more fields that have usable bits for the SCell dormancy indication and/or the HARQ feedback indication when the DCI message does not schedule data. In some aspects, one or more fields of the DCI message may be unused when the DCI message does not schedule data, and these unused fields can be repurposed to carry the SCell dormancy indication and/or the HARQ feedback indication when the DCI message does not schedule data. For example, in some aspects, the fields that have usable bits when the DCI message does not schedule data may include a five-bit modulation and coding scheme (MCS) field, a one-bit new data indication (NDI) field, a two-bit redundancy version (RV) field, a four-bit HARQ process number field, an antenna port(s) field that has at least four bits, a one-bit demodulation reference signal (DMRS) sequence initialization field, and/or the like. Accordingly, in this example, the unused MCS, NDI, RV, HARQ, antenna, and DMRS fields provide at least 17 usable bits, which may provide a sufficient quantity of bits to accommodate both the SCell dormancy indication that includes up to 15 bits and the one-bit HARQ feedback indication. Furthermore, in cases where the DCI message that does not schedule data includes only one of the SCell dormancy indication or the one-bit HARQ feedback indication, the usable bits in the unused fields may be used for either the SCell dormancy indication or the one-bit HARQ feedback indication, and a separate DCI message can be used to convey the other indication.

Accordingly, the DCI that is transmitted via the control channel associated with the PCell and received by the UE 305 may generally provide the SCell dormancy indication and the HARQ feedback indication in one or more DCI messages that may be configured as shown in FIG. 3. Furthermore, in cases where two DCI messages are transmitted to separately communicate the SCell dormancy indication and the HARQ feedback indication, the two DCI messages may be configured to have an equal size to simplify decoding at the UE 305. For example, in cases where one or more fields are appended to the DCI message when the DCI message schedules data, the size of the DCI message may increase according to a total size of the appended fields (e.g., up to 16 additional bits in cases where separate fields are appended for the SCell dormancy indication and the HARQ feedback indication and the SCell dormancy indication includes the maximum 15 bits). Accordingly, when two DCI messages are transmitted to separately communicate the SCell dormancy indication and the HARQ feedback indication (e.g., one DCI message that schedules data and one DCI message that does not schedule data), a quantity of bits may be added to a smaller one of the DCI messages until the two DCI messages have an equal size.

In some aspects, the UE 305 may decode the one or more DCI messages based at least in part on a value of the FDRA field. For example, in cases where a DCI message schedules data, the value of the FDRA field may be set to a valid value that does not correspond to a predefined value reserved to indicate that the DCI message triggers HARQ-ACK codebook feedback and does not schedule data, as described above. In such cases, the UE 305 may obtain the SCell dormancy indication and the HARQ feedback indication from separate fields that are appended to the DCI message. Alternatively, in some aspects, the UE 305 may obtain one of the SCell dormancy indication or the HARQ feedback indication from a field appended to the DCI message, and the other indication may be obtained from a subsequent DCI message that does not schedule data. Additionally, or alternatively, in cases where a DCI message does not schedule data, the value of the FDRA field may be set to an invalid value or a predefined valid value, as described above. In such cases, the UE 305 may obtain the SCell dormancy indication and/or the HARQ feedback indication from the one or more unused fields that provide usable bits for the SCell dormancy indication and/or the HARQ feedback indication. For example, the DCI message that does not schedule data may include both the SCell dormancy indication and the HARQ feedback indication in the usable bits of the one or more unused fields, or only one of the SCell dormancy indication and the HARQ feedback indication with the other indication provided in a separate DCI message (e.g., a DCI message that schedules data). In the former case, where the DCI message that does not schedule data includes both the SCell dormancy indication and the HARQ feedback indication, a validity of the SCell dormancy indication may depend on a value of the HARQ feedback indication. For example, the SCell dormancy indication may be unused (e.g., invalid or ignored by the UE 305) if the one bit for the HARQ feedback indication is set to a value that triggers or requests HARQ-ACK codebook feedback. Additionally, or alternatively, the SCell dormancy indication may be used (e.g., valid or otherwise decoded by the UE 305) if the one bit for the HARQ feedback indication is set to a value to indicate that HARQ-ACK codebook feedback is not triggered or otherwise requested. Alternatively, in some aspects, the SCell dormancy indication may always be valid regardless of the value of the HARQ feedback indication.

At 340, the UE 305 may reduce scheduled activity in one or more SCells based at least in part on the SCell dormancy indication. For example, the UE 305 may identify one or more SCells that are in a dormant mode from the SCell dormancy indication and reduce scheduled activity in such SCell(s). For example, the UE 305 may schedule no PDCCH or PDSCH reception in the one or more dormant SCells, may perform less frequent downlink measurements for beam management and/or channel state information reporting in the one or more dormant SCells, and/or the like.

At 342, the UE 305 may transmit HARQ-ACK feedback to the base station 110 operating the PCell based at least in part on the HARQ feedback indication. For example, in cases where the DCI includes a HARQ feedback indication that triggers HARQ-ACK codebook feedback and schedules a downlink data transmission, such as a PDSCH, the UE 305 may generate and transmit HARQ-ACK feedback to indicate whether the downlink data transmission scheduled by the DCI was successfully received. Additionally, or alternatively, in cases where the DCI includes a HARQ feedback indication that triggers HARQ-ACK codebook feedback and does not schedule a downlink data transmission, the UE 305 may generate and transmit HARQ-ACK feedback to indicate whether the DCI was successfully received.

As indicated above, FIG. 3 is provided as an example. Other examples may differ from what is described with respect to FIG. 3.

Figure 4:
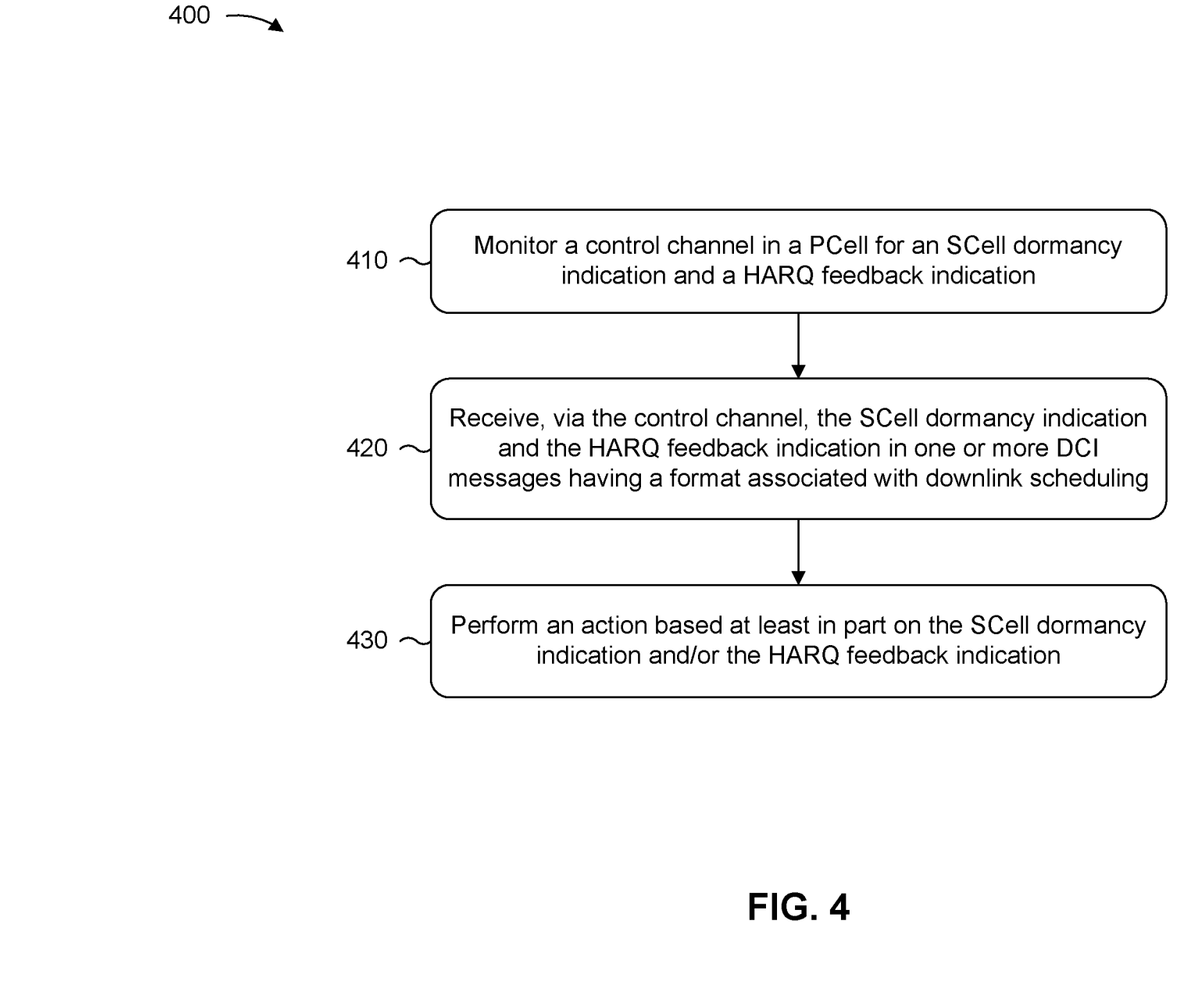
FIG. 4 is a flowchart of a method of wireless communication.

FIG. 4 is a flowchart of a method 400 of wireless communication. The method may be performed by a UE (e.g., the UE 120 of FIG. 1, the UE 120 of FIG. 2, the UE 305 of FIG. 3, the apparatus 502 of FIG. 5, the apparatus 502' of FIG. 6, and/or the like).

At 410, the UE may monitor a control channel in a PCell for an SCell dormancy indication and a HARQ feedback indication. For example, the UE may monitor (e.g., using antenna 252, DEMOD 254, MIMO detector 256, receive processor 258, controller/processor 280, and/or the like) a control channel in a PCell for an SCell dormancy indication and a HARQ feedback indication, as described in more detail above. In some aspects, the monitoring of the control channel is performed during a radio connected active time or a discontinuous reception active time.

At 420, the UE may receive, via the control channel, the SCell dormancy indication and the HARQ feedback indication in one or more DCI messages having a format associated with downlink scheduling. For example, the UE may receive (e.g., using antenna 252, DEMOD 254, MIMO detector 256, receive processor 258, controller/processor 280, and/or the like), via the control channel, the SCell dormancy indication and the HARQ feedback indication in one or more DCI messages having a format associated with downlink scheduling, as described in more detail above. In a first aspect, the one or more DCI messages include a single DCI message having an appended field for the SCell dormancy indication and an appended bit for the HARQ feedback indication based at least in part on the single DCI message scheduling downlink data. In a second aspect, alone or in combination with the first aspect, the one or more DCI messages include a first DCI message that schedules downlink data and has an appended bit for the HARQ feedback indication, and a second DCI message that does not schedule downlink data and includes the SCell dormancy indication in one or more unused fields of the second DCI message. In a third aspect, alone or in combination with one or more of the first and second aspects, the appended bit for the HARQ feedback indication is included in a field configured for the SCell dormancy indication. In a fourth aspect, alone or in combination with one or more of the first through third aspects, the one or more DCI messages include a first DCI message that schedules downlink data and has an appended field for the SCell dormancy indication, and a second DCI message that does not schedule downlink data and includes a bit for the HARQ feedback indication in one or more unused fields of the second DCI message.

In a fifth aspect, alone or in combination with one or more of the first through fourth aspects, the one or more DCI messages include an FDRA field having a predefined value to indicate that the one or more DCI messages do not schedule downlink data based at least in part on the HARQ feedback indication triggering HARQ feedback. In a sixth aspect, alone or in combination with one or more of the first through fifth aspects, the one or more DCI messages include a single DCI message with a field for the SCell dormancy indication and a bit for the HARQ feedback indication. In a seventh aspect, alone or in combination with one or more of the first through sixth aspects, the field for the SCell dormancy indication and the bit for the HARQ feedback indication are in one or more unused fields of the single DCI message based at least in part on the predefined value in the FDRA field. In an eighth aspect, alone or in combination with one or more of the first through seventh aspects, a validity of the SCell dormancy indication depends on whether the bit for the HARQ feedback indication triggers HARQ feedback. For example, in a ninth aspect, alone or in combination with one or more of the first through eighth aspects, the UE may determine that the SCell dormancy indication is valid based at least in part on the HARQ feedback indication indicating that HARQ feedback is not requested by the one or more DCI messages. Additionally, or alternatively, in a tenth aspect, alone or in combination with one or more of the first through ninth aspects, the UE may determine that the SCell dormancy indication is invalid based at least in part on the HARQ feedback indication indicating that HARQ feedback is requested by the one or more DCI messages.

In an eleventh aspect, alone or in combination with one or more of the first through tenth aspects, the one or more DCI messages include a first DCI message that schedules downlink data and a second DCI message that does not schedule downlink data, and the first DCI message and the second DCI message have an equal size. In a twelfth aspect, alone or in combination with one or more of the first through eleventh aspects, a quantity of bits is added to a smaller one of the first DCI message and the second DCI message such that the first DCI message and the second DCI message have the equal size.

At 430, the UE may perform an action based at least in part on the SCell dormancy indication and the HARQ feedback indication. For example, the UE may perform (e.g., using antenna 252, DEMOD 254, MIMO detector 256, receive processor 258, controller/processor 280, transmit processor 264, TX MIMO processor 266, MOD 254, antenna 252 and/or the like) an action based at least in part on the SCell dormancy indication and the HARQ feedback indication, as described in more detail above. For example, the action may include reducing one or more activities in one or more SCells that are operating in a dormant mode (e.g., not scheduling downlink reception, performing less frequent downlink measurements for beam management and reporting channel state information, and/or the like). Additionally, or alternatively, when the HARQ feedback indication includes a request for HARQ feedback, the action may include generating and transmitting feedback to a base station to indicate whether a downlink transmission was successfully received, where the HARQ feedback may be for the DCI message(s), a downlink transmission scheduled by the DCI message(s), and/or the like.

Method 400 may include additional aspects, such as any single aspect or any combination of aspects described elsewhere herein and/or in connection with one or more other processes described elsewhere herein.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
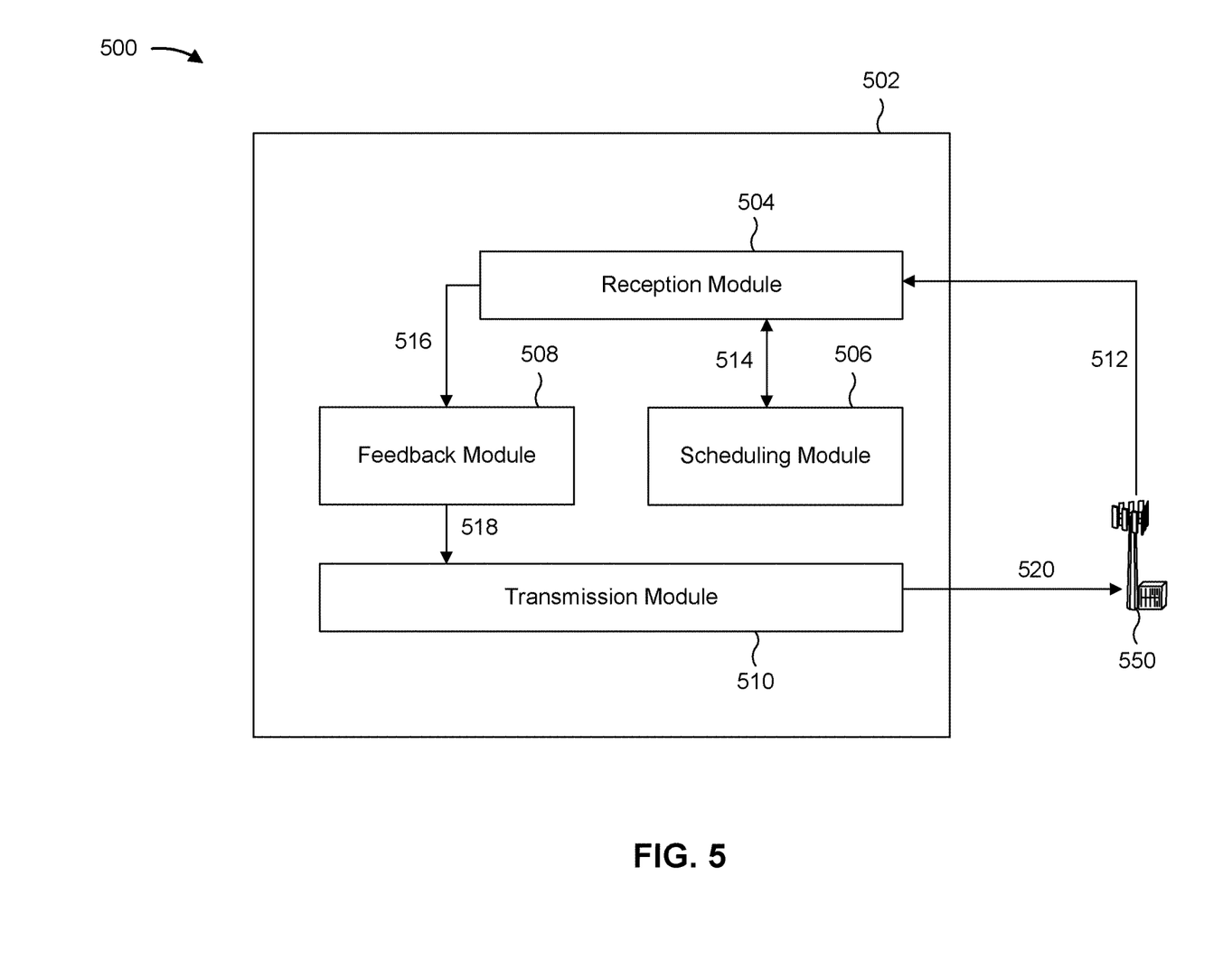
FIG. 5 is a block diagram illustrating an example data flow between different modules/means/components in an example apparatus.

FIG. 5 is a conceptual data flow diagram 500 illustrating data flow between different modules/means/components in an example apparatus 502. The apparatus 502 may be a UE in communication with a base station 550. In some aspects, the apparatus 502 includes a reception module 504, a scheduling module 506, a feedback module 508, and/or a transmission module 508.

Reception module 504 may receive, as data 512, one or more DCI messages from the base station 550. For example, the one or more DCI messages may be received via a control channel associated with a PCell, and may include an SCell dormancy indication for one or more SCells, a HARQ feedback indication, and/or the like. In some aspects, the one or more DCI messages may include a single DCI message that carries both the SCell dormancy indication and the HARQ feedback indication, or the one or more DCI messages may include two DCI messages that separately convey the SCell dormancy indication and the HARQ feedback indication. In some aspects, the one or more DCI messages may schedule a downlink data transmission or may not schedule a downlink data transmission, and a field in the DCI messages (e.g., an FDRA field) may indicate whether the DCI messages schedule a downlink data transmission. Furthermore, fields used to carry the SCell dormancy indication and the HARQ feedback indication may depend on whether the DCI messages schedule a downlink data transmission. For example, in a DCI message that schedules a downlink data transmission, one or more fields may be appended to the DCI message to carry the SCell dormancy indication and/or the HARQ feedback indication. Additionally, or alternatively, in a DCI message that does not schedule a downlink data transmission, one or more fields within the DCI message may include usable bits that can be used to carry the SCell dormancy indication and/or the HARQ feedback indication. In some aspects, reception module 504 may include an antenna (e.g., antenna 252), a receive processor (e.g., receive processor 258), a controller/processor (e.g., controller/processor 280), a transceiver, a receiver, and/or the like.

Scheduling module 506 may receive, as data 514, information related to the SCell dormancy indication from the reception module 504. Accordingly, in some aspects, scheduling module 506 may reduce one or more scheduled activities in one or more dormant SCells, which may be identified based at least in part on the SCell dormancy indication. For example, scheduling module 506 may refrain from scheduling PDCCH and/or PDSCH reception in the one or more dormant SCells, reduce a frequency at which downlink measurements are performed in the one or more dormant SCells, and/or the like. Accordingly, scheduling module 506 may provide, as data 514, information to reception module 504 to reduce one or more scheduled activities in the one or more dormant SCells, as described above. In some aspects, scheduling module 506 may include a processor (e.g., a transmit processor 264, a receive processor 258, a controller/processor 280, and/or the like).

Feedback module 508 may receive, as data 516, information related to the HARQ feedback indication from the reception module 504. Accordingly, in some aspects, feedback module 508 may generate HARQ-ACK feedback for one or more downlink transmissions when the HARQ feedback indication triggers or otherwise requests the HARQ-ACK feedback. For example, when the DCI carrying the HARQ feedback indication schedules a downlink data transmission, such as a PDSCH, feedback module 508 may generate HARQ-ACK feedback to indicate whether the downlink data transmission was successfully received. Additionally, or alternatively, when the DCI carrying the HARQ feedback indication does not schedule a downlink data transmission, feedback module 508 may generate HARQ-ACK feedback to indicate whether the DCI was successfully received. In some aspects, feedback module 508 may include a processor (e.g., a transmit processor 264, a receive processor 258, a controller/processor 280, and/or the like).

Transmission module 510 may receive, as data 518, information related to the HARQ-ACK feedback generated by feedback module 508 and may transmit, as data 520, the HARQ-ACK feedback to the base station 550. In some aspects, transmission module 510 may include an antenna (e.g., antenna 252), a transmit processor (e.g., transmit processor 264), a controller/processor (e.g., controller/processor 280), a transceiver, a transmitter, and/or the like.

The apparatus may include additional modules that perform each of the blocks of the algorithm in the aforementioned method 400 of FIG. 4 and/or the like. Each block in the aforementioned method 400 of FIG. 4 and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
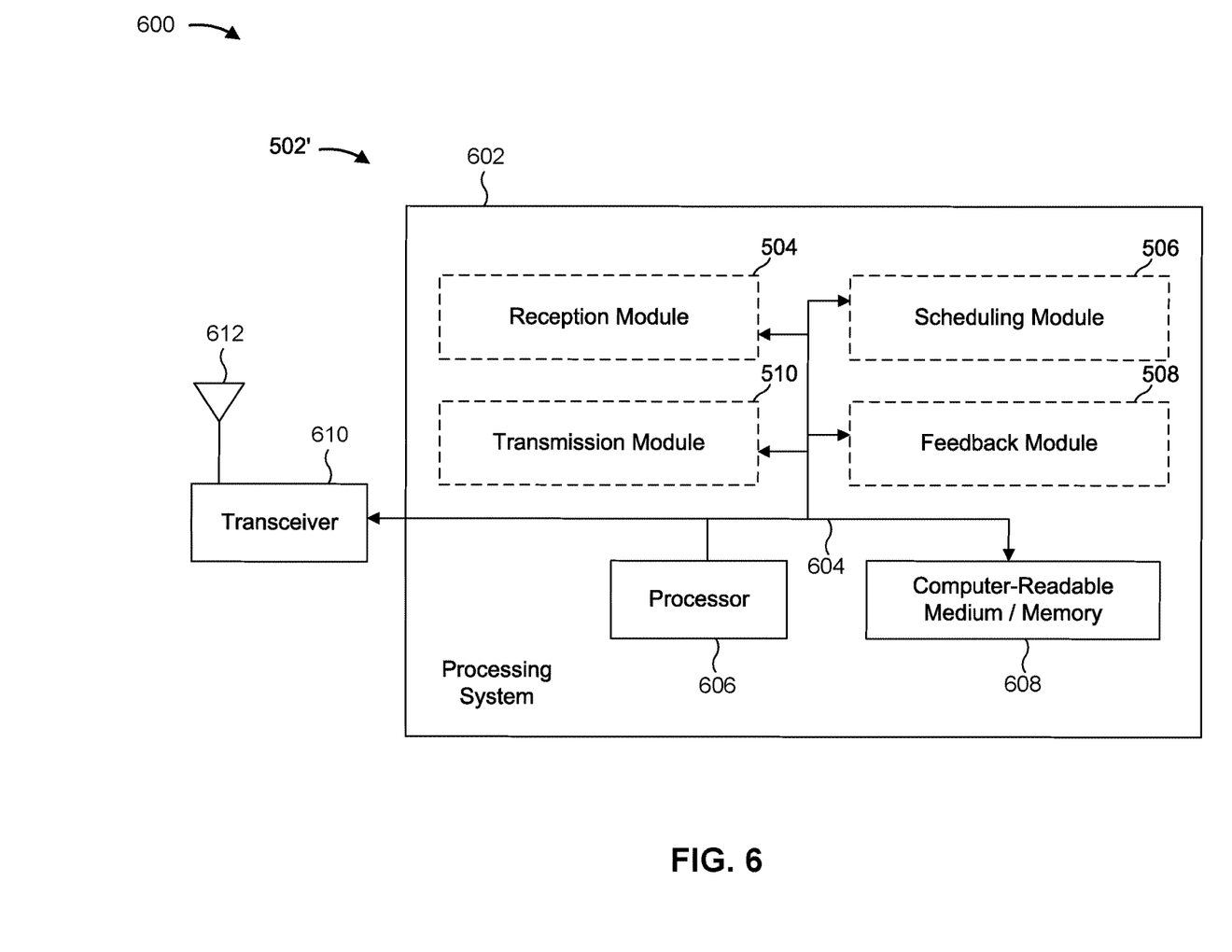
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be a UE.

The processing system 602 may be implemented with a bus architecture, represented generally by the bus 604. The bus 604 may include any number of interconnecting buses and bridges depending on the specific application of the processing system 602 and the overall design constraints.

The bus 604 links together various circuits including one or more processors and/or hardware modules, represented by the processor 606, the modules 504, 506, 508, 510 and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602, specifically the reception module 504. In addition, the transceiver 610 receives information from the processing system 602, specifically the transmission module 510, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, 508, and 510. The modules 504, 506, 508, and 510 may be software modules running in the processor 606, resident/stored in the computer readable medium/memory 608, one or more hardware modules coupled to the processor 606, or some combination thereof. The processing system 602 may be a component of the UE 120 and may include the memory 282 and/or at least one of the TX MIMO processor 266, the RX processor 258, and/or the controller/processor 280.

In some aspects, the apparatus 502/502' for wireless communication includes means for monitoring a control channel in a PCell for an SCell dormancy indication and a HARQ feedback indication, means for receiving, via the control channel, the SCell dormancy indication and the HARQ feedback indication in DCI, which includes the SCell dormancy indication and the HARQ feedback indication in one or more DCI messages having a format associated with downlink scheduling, and/or the like. The aforementioned means may be one or more of the aforementioned modules of the apparatus 502 and/or the processing system 502 of the apparatus 502' configured to perform the functions recited by the aforementioned means. As described elsewhere herein, the processing system 502 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for".

What is claimed is:

1. A method of wireless communication performed by a network entity, comprising:
   transmitting, via a control channel in a primary cell, a secondary cell (SCell) dormancy indication and a hybrid automatic repeat request (HARQ) feedback indication in a downlink control information (DCI) message,
      wherein the DCI message has a format associated with downlink scheduling,
      wherein, in response to the DCI message not scheduling downlink data, the DCI message includes a field for the SCell dormancy indication and a bit for the HARQ feedback indication, and
      wherein a validity of the SCell dormancy indication depends on whether the bit for the HARQ feedback indication triggers HARQ feedback.

2. The method of claim 1, wherein the network entity transmits the DCI message during one or more of a radio connected active time or a discontinuous reception active time.

3. The method of claim 1, wherein, in response to the DCI message scheduling the downlink data, the DCI message has an appended field for the SCell dormancy indication and an appended bit for the HARQ feedback indication.

4. The method of claim 3, further comprising:
   receiving the HARQ feedback indicating whether the downlink data scheduled in the DCI message was successfully received based at least in part on the appended bit for the HARQ feedback indication triggering the HARQ feedback.

5. The method of claim 1, wherein, in response to the DCI message scheduling the downlink data, the DCI message has an appended bit for the HARQ feedback indication, and
   wherein, in response to the DCI message not scheduling the downlink data, the field for the SCell dormancy indication is in one or more unused fields of the DCI message.

6. The method of claim 5, wherein the appended bit for the HARQ feedback indication is included in another field configured for the SCell dormancy indication.

7. The method of claim 1, wherein, in response to the DCI message scheduling the downlink data, the DCI message has an appended field for the SCell dormancy indication, and
   wherein, in response to the DCI message not scheduling the downlink data, the bit for the HARQ feedback indication is in one or more unused fields of the DCI message.

8. The method of claim 1, wherein the DCI message includes a frequency domain resource allocation (FDRA) field having a predefined value to indicate that the DCI message does not schedule the downlink data.

9. The method of claim 8, wherein the field for the SCell dormancy indication is in one or more unused fields of the DCI message based at least in part on the predefined value in the FDRA field.

10. The method of claim 1, wherein the SCell dormancy indication is valid based at least in part on the HARQ feedback indication indicating that the HARQ feedback is not requested by the DCI message.

11. The method of claim 1, wherein the SCell dormancy indication is invalid based at least in part on the HARQ feedback indication indicating that the HARQ feedback is requested by the DCI message.

12. The method of claim 1, further comprising:
   receiving the HARQ feedback indicating whether the DCI message was successfully received based at least in part on the HARQ feedback indication indicating that the HARQ feedback is requested by the DCI message.

13. The method of claim 1, wherein the DCI message is a first DCI message and a second DCI message schedules the downlink data, and wherein the first DCI message and the second DCI message have an equal size.

14. The method of claim 13, wherein a quantity of bits is added to a smaller one of the first DCI message and the second DCI message such that the first DCI message and the second DCI message have the equal size.

15. An apparatus for wireless communication at a network entity, comprising:
   one or more memories; and
   one or more processors coupled to the one or more memories, the one or more processors individually or collectively configured to:
      transmit, via a control channel in a primary cell, a secondary cell (SCell) dormancy indication and a hybrid automatic repeat request (HARQ) feedback indication in a downlink control information (DCI) message,
         wherein the DCI message has a format associated with downlink scheduling,
         wherein, when the DCI message does not schedule downlink data, the DCI message includes a field for the SCell dormancy indication and a bit for the HARQ feedback indication, and wherein a validity of the SCell dormancy indication depends on whether the bit for the HARQ feedback indication triggers HARQ feedback.

16. The network entity of claim 15, wherein the control channel is monitored during one or more of a radio connected active time or a discontinuous reception active time.

17. The network entity of claim 15, wherein, when the DCI message schedules the downlink data, the DCI message has an appended field for the SCell dormancy indication and an appended bit for the HARQ feedback indication.

18. The network entity of claim 17, wherein the one or more processors are further configured to:
receive the HARQ feedback indicating whether the downlink data scheduled in the DCI message was successfully received based at least in part on the appended bit for the HARQ feedback indication triggering the HARQ feedback.

19. The network entity of claim 15, wherein, when the DCI message schedules the downlink data, the DCI message has an appended bit for the HARQ feedback indication, and
wherein, when the DCI message does not schedule the downlink data, the field for the SCell dormancy indication is in one or more unused fields of the DCI message.

20. The network entity of claim 19, wherein the appended bit for the HARQ feedback indication is included in another field configured for the SCell dormancy indication.

21. The network entity of claim 15, wherein, when the DCI message schedules the downlink data, the DCI message has an appended field for the SCell dormancy indication, and
wherein, when the DCI message does not schedule the downlink data, the bit for the HARQ feedback indication is in one or more unused fields of the DCI message.

22. The network entity of claim 15, wherein the DCI message includes a frequency domain resource allocation (FDRA) field having a predefined value to indicate that the DCI message does not schedule the downlink data.

23. The network entity of claim 22, wherein the field for the SCell dormancy indication is in one or more unused fields of the DCI message based at least in part on the predefined value in the FDRA field.

24. The network entity of claim 15, wherein the SCell dormancy indication is valid based at least in part on the HARQ feedback indication indicating that the HARQ feedback is not requested by the DCI message.

25. The network entity of claim 15, wherein the SCell dormancy indication is invalid based at least in part on the HARQ feedback indication indicating that the HARQ feedback is requested by the DCI message.

26. The network entity of claim 15, wherein the one or more processors are further configured to:
receive the HARQ feedback indicating whether the DCI message was successfully received based at least in part on the HARQ feedback indication indicating that the HARQ feedback is requested by the DCI message.

27. The network entity of claim 15, wherein the DCI message is a first DCI message and a second DCI message schedules the downlink data, and wherein the first DCI message and the second DCI message have an equal size.

28. The network entity of claim 27, wherein a quantity of bits is added to a smaller one of the first DCI message and the second DCI message such that the first DCI message and the second DCI message have the equal size.

29. A non-transitory computer-readable medium storing a set of instructions for wireless communication, the set of instructions comprising:
one or more instructions that, when executed by one or more processors of a network entity, cause the network entity to:
transmit, via a control channel in a primary cell, a secondary cell (SCell) dormancy indication and a hybrid automatic repeat request (HARQ) feedback indication in a downlink control information (DCI) message,
wherein the DCI message has a format associated with downlink scheduling,
wherein, when the DCI message does not schedule downlink data, the DCI message includes a field for the SCell dormancy indication and a bit for the HARQ feedback indication, and
wherein a validity of the SCell dormancy indication depends on whether the bit for the HARQ feedback indication triggers HARQ feedback.

30. An apparatus for wireless communication, comprising:
means for generating a downlink control information (DCI) message including a secondary cell (SCell) dormancy indication and a hybrid automatic repeat request (HARQ) feedback indication,
wherein the DCI message has a format associated with downlink scheduling,
wherein, when the DCI message does not schedule downlink data, the DCI message includes a field for the SCell dormancy indication and a bit for the HARQ feedback indication, and
wherein a validity of the SCell dormancy indication depends on whether the bit for the HARQ feedback indication triggers HARQ feedback; and
means for transmitting the DCI message via a control channel in a primary cell.

\* \* \* \* \*